United States Patent [19]

van der Lely

[11] 4,344,490
[45] Aug. 17, 1982

[54] SOIL CULTIVATING IMPLEMENT

[75] Inventor: Ary van der Lely, Maasland, Netherlands

[73] Assignee: C. Van der Lely N.V., Maasland, Netherlands

[21] Appl. No.: 181,422

[22] Filed: Aug. 26, 1980

[30] Foreign Application Priority Data

Sep. 5, 1979 [NL] Netherlands ................. 7906631

[51] Int. Cl.³ .................................... A01B 29/04
[52] U.S. Cl. ................................. 172/253; 172/552; 172/68; 172/749
[58] Field of Search ............... 172/68, 552, 553, 253, 172/749; 301/52, 44 R; 305/55, 51

[56] References Cited

U.S. PATENT DOCUMENTS

| 1,512,502 | 10/1924 | Schilling | 172/552 X |
| 1,568,090 | 1/1926 | Saives | 301/44 R |
| 4,006,781 | 2/1977 | Lely et al. | 172/68 |
| 4,051,904 | 10/1977 | Lely et al. | 172/68 |
| 4,068,724 | 1/1978 | Lely | 172/68 |
| 4,189,006 | 2/1980 | Lely | 172/68 |

Primary Examiner—Richard J. Johnson
Attorney, Agent, or Firm—William B. Mason

[57] ABSTRACT

A soil cultivating implement has a row of tined soil working members extending transverse to the direction of travel. An implement-supporting and soil-working cage-formation ground roller is arranged behind said soil working members to be rotatable about a substantially horizontal axis. The roller has a plurality of relatively spaced apart carrier discs fixedly interconnected by a plurality of tubular elongate elements that are wound helically around the axis of rotation of the roller. When light and/or dry soil is to be cultivated, it is desirable that additional elongate elements should be placed in the skeletal cylindrically curved ground-engaging surface of the roller. A chosen number of auxiliary elongate elements can be arranged between the fixed elongate elements quickly and these elements are easily detachable and re-connectable. Each auxiliary element is positively secured only to the two outer carrier discs and one end of each auxiliary element carries a pin that is enterable in a hole in an outer disc. The opposite end of said element carries locking means comprising a pair of spaced tongues and a spring-loaded retaining pin which co-operates with holes in the tongues and with one of the holes in the opposite outer end carrier disc that is sandwiched between the tongues. Single bolts may, if preferred, be employed in place of the spring-loaded retaining pins. Each carrier disc has crescent-shaped peripheral recesses and each auxiliary elongate element carries crescent-shaped stops which lodge in the matchingly shaped recesses when installed. Preferably, each auxiliary element is of helical configuration and can be resiliently pre-stressed to some extent before retaining engagement of the corresponding pin or bolt so that the stops are urged, with some pre-stressing, into the peripheral recesses of the carrier discs.

11 Claims, 9 Drawing Figures

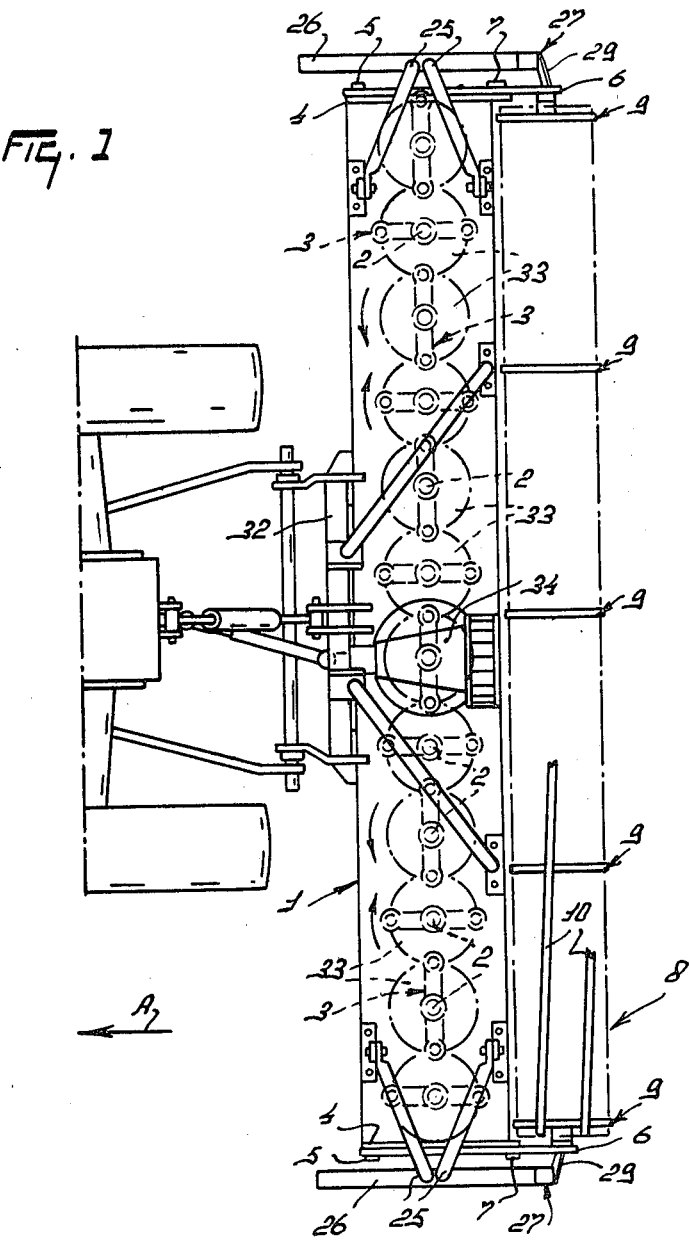

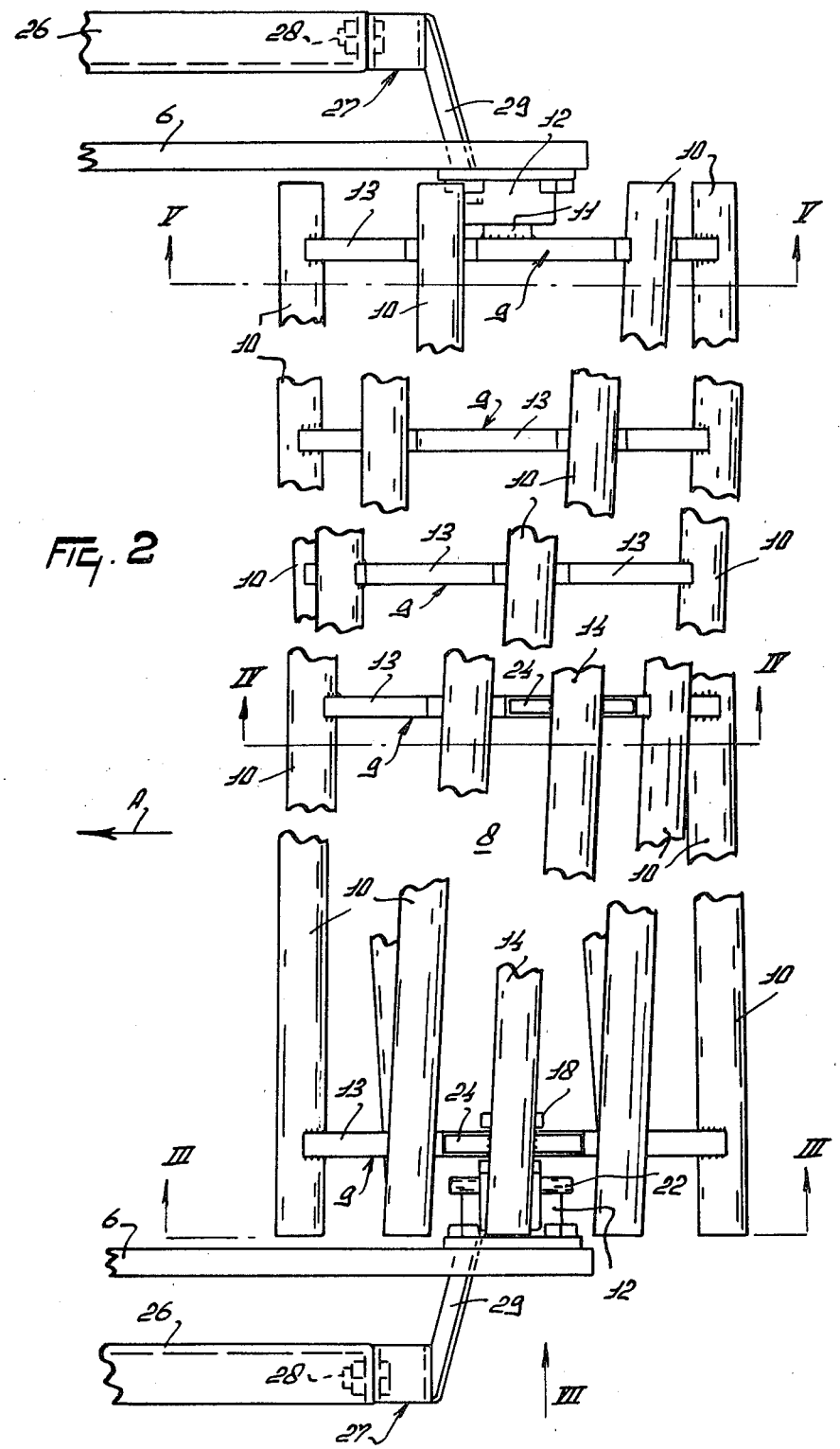

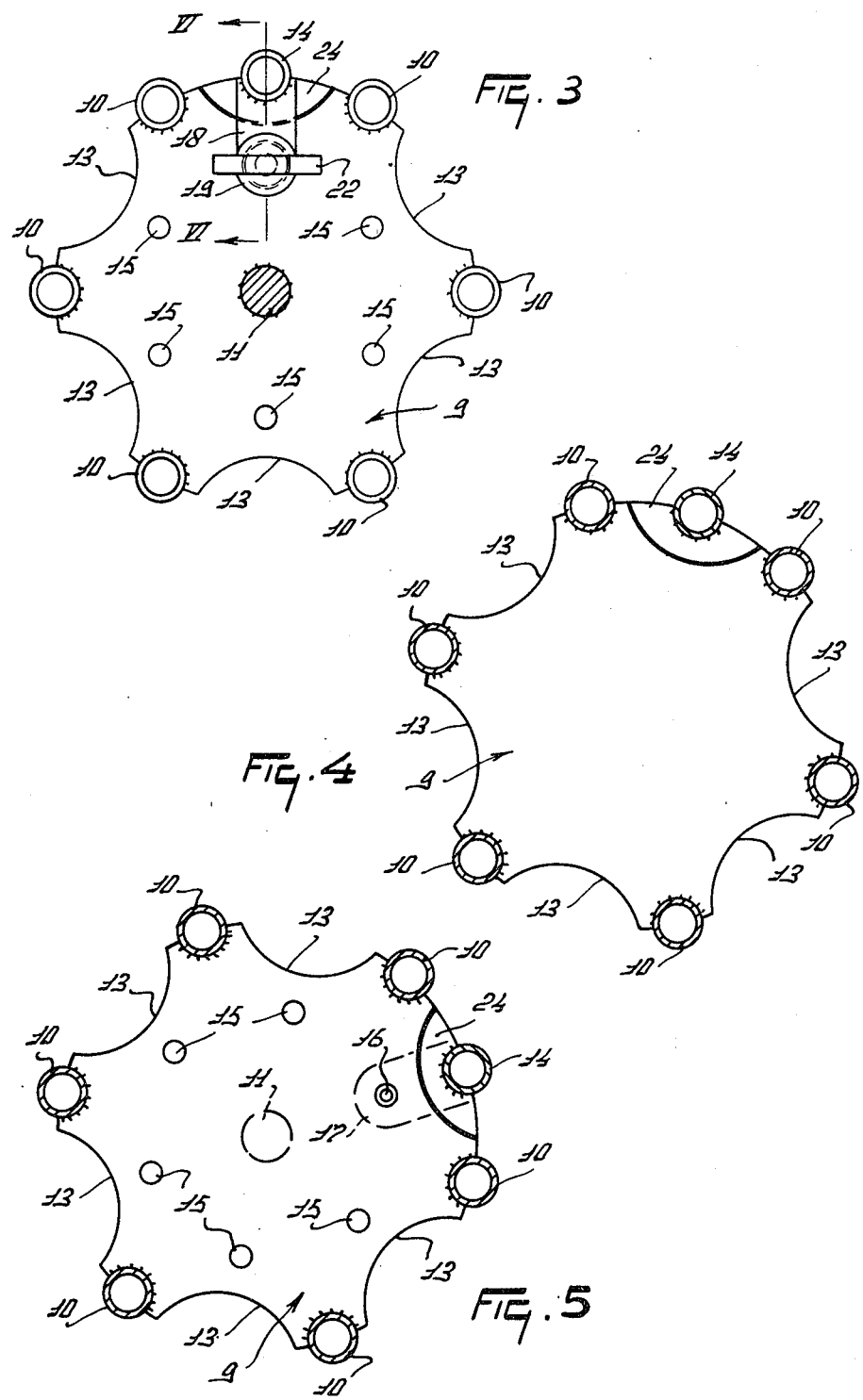

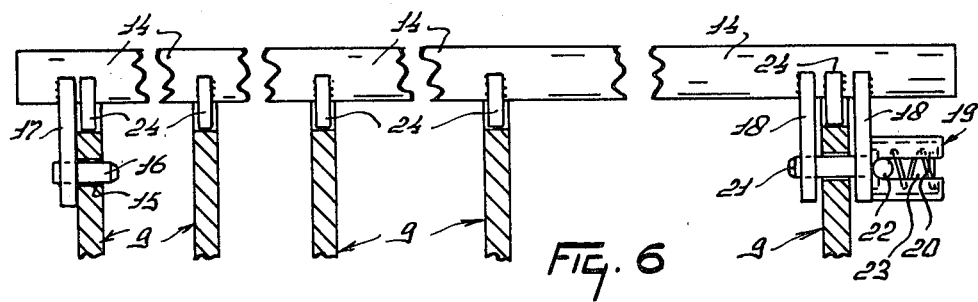
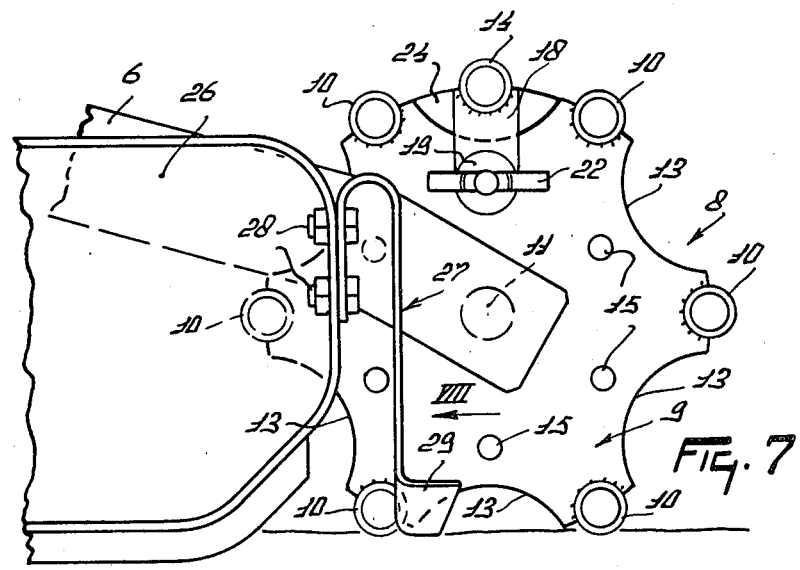
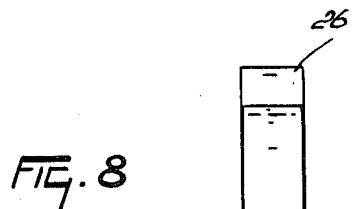
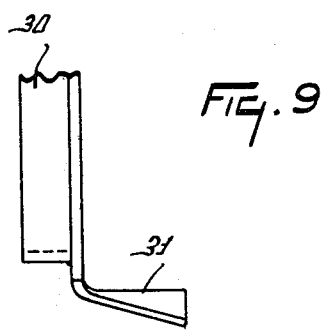

SOIL CULTIVATING IMPLEMENT

This invention relates to soil cultivating implements or machines of the kind which comprise a plurality of soil working members and a ground roller which is arranged behind the soil working members with respect to the intended direction of operative travel of the implement or machine so as at least partly to support the latter from the ground surface in the use thereof, the ground-engaging surface of the roller exhibiting a plurality of elongate elements which are supported by spaced carries so as to extend lengthwise with respect to the intended axis of rotation of the roller with at least one of those elements being detachable from, and reconnectable to, the remainder of the roller. The term "implement(s) or machine(s)" is shortened to "implement(s)" alone throughout the remainder of this specification for the sake of brevity.

Known implements of the kind set forth above usually have the or each detachable element passed through circumferential holes in the carriers and, particularly when the elements are helically disposed around the intended axis of rotation of the roller, the addition or removal of detachable elements has proved to be a tediously time-consuming task which, consequently, has sometimes been shirked even when really necessary for the optimum operation of the implement. The present invention accordingly seeks to overcome, or very greatly to minimise, this disadvantage and provides a soil cultivating implement of the kind set forth, wherein, when installed in the roller, the or each detachable element is releasably fastened to only two of said carriers so as to bear against the peripheries of at least those two carriers.

For a better understanding of the invention, and to show how the same may be carried into effect, reference will now be made, by way of example, to the accompanying drawings, in which:

FIG. 1 is a plan view of a soil cultivating implement in accordance with the invention shown connected to the rear of an agricultural tractor, FIG. 2 is a plan view, to a considerably enlarged scale, showing details of the construction of a roller which is located at the rear of the implement of FIG. 1, FIGS. 3, 4 and 5 are sections taken on the lines III—III, IV—IV and V—V, respectively, in FIG. 2, FIG. 6 is a section taken on the line VI—VI in FIG. 3, FIG. 7 is a side elevation as seen in the direction indicated by an arrow VII in FIG. 2, FIG. 8 is a scrap rear elevation as seen in the direction indicated by an arrow VIII in FIG. 7, and FIG. 9 is a scrap plan view illustrating an alternative form a shield plate of the implement carrying an alternative form of scraping element.

Referring to the accompanying drawings, the soil cultivating implement that is illustrated therein has a hollow box-section frame portion 1 that extends substantially horizontally transverse and usually, as illustrated, substantially horizontally perpendicular, to the intended direction of operative travel of the implement which is indicated by an arrow A in FIGS. 1 and 2 of the drawings. The hollow frame portion 1 rotatably supports a plurality (for example, twelve) of non-horizontal shafts 2 which will usually be vertically or substantially vertically disposed, said shafts 2 being arranged in a single row that is parallel to the transverse length of the frame portion 1 with their longitudinal axes (axes of rotation) spaced apart from one another at regular intervals which advantageously, but not essentially, have magnitudes of substantially 25 centimeters. Each shaft 2 projects downwardly from beneath the bottom of the hollow frame portion 1 and is there provided with a corresponding soil working member 3 which comprises a diametrically opposite pair of rigid tines that are firmly but releasably secured to a horizontal or substantially horizontal carrier or support. The two tines of each rotary soil working member 3 are spaced apart from one another by a little greater distance than the regular spacing between the longitudinal axes of the shafts 2 so that, when the implement is in operative, the soil working members 3 cultivate overlapping strips of soil so that a single broad strip of worked soil results which will have, with the illustrated travel of twelve soil working members 3 and the preferred spacing of substantially 25 centimeters between their axes of rotation, a width of substantially 3 meters. It is emphasised that a total of twelve rotary soil working members 3 is by no means mandatory and that the invention is equally applicable to implements which have greater or lesser numbers of the soil working members 3. The opposite ends of the hollow frame portion 1 are closed by corresponding substantially vertically disposed side plates 4 each of which is of approximately sector-shaped configuration, the rearmost edge thereof, with respect to the direction A, being of greater vertical extent than is the front thereof and said rearmost edge projecting a short distance behind the hollow body of the frame portion 1 with respect to the direction A. The fronts of the two side plates 4 carry substantially horizontally aligned pivots 5 about which corresponding arms 6 are turnable upwardly and downwardly alongside the respective plates 4, said arms 6 extending generally rearwardly from their pivots 5 with respect to the direction A so as to project some distance behind the rear edges of the side plates 4. The rear edges of the side plates 4 that project behind the hollow body of the frame portion 1 are formed with curved rows of holes in which each hole is equidistant from the axis that is defined by the pivots 5 and each arm 6 is formed with at least one hole at the same distance from that axis. Accordingly, the holes in the arms 6 can be brought into register which chosen ones of the holes in the side plates 4 by turning said arms 6 upwardly and downwardly, as may be required, about the pivots 5 and locking bolts 7 are provided for entry through the holes which have just been mentioned to retain the arms 6 firmly but releasably in chosen angular settings about the axis which is defined by the pivots 5.

An open-work ground roller 8 is rotatably mounted between substantially horizontally aligned bearings that are carried at the rearmost ends of the two arms 6. The roller 8 comprises a plurality (such as five) of regularly spaced apart carrier discs 9 which are all vertically or substantially vertically disposed in parallel relationship with each other and parallel or substantially parallel relationship with the direction A, it being noted that two of the carrier discs 9 are located very close to the opposite axial ends of the roller 8. As can be seen in FIGS. 3, 4, 5 and 7 of the drawings, the five carrier discs 9 are rigidly interconnected by six elongate elements 10 that are in the form of metal tubes of circular cross-section. The elements 10 are welded or otherwise rigidly secured in relatively small and substantially semicircular recesses which are formed in the circumferences of the carrier discs 9 at regular 60° intervals around the center of each such disc 9. As can be seen best in FIGS. 1 and 2 of the drawings, each carrier disc 9 is turned through substantially 18° about its center relative to the or each of its immediate neighbours in the roller 8 with the result that the six elongate elements 10 all extend lengthwise of the roller 8 but are wound helically around its longitudinal axis (axis of rotation) to some extent. The outer sides of the two carrier discs 9 which are at substantially the opposite ends of the roller 8 rigidly carry short centrally disposed and axially extending stub shafts 11 which stub shafts are rotatably received in the corresponding previously mentioned substantially horizontally aligned bearings which are carried at the rearmost ends of the two arms 6, these bearings being given the reference 12 in FIG. 2 of the drawings.

The periphery of each carrier disc 9 is formed, centrally between each successive pair of elongate elements 10, with a relatively large crescent-shaped recess 13, there thus being six of the larger crescent-shaped recesses 13 at regular intervals around the periphery of each disc 9. In order to enable an open-work ground roller to be able to co-operate effectively with soils of different kinds and in various conditions (for example, light, sandy soil in a dry condition or heavy, clay soil in a wet condition), it is desirable to be able to augment or decrease the number of elongate elements which skeletally define the cylindrically curved surface of the roller and, as briefly discussed at the beginning of this specification, it would be a considerable practical advantage to be able to add, and remove, auxiliary elongate elements of the roller both quickly and easily. Accordingly, and in accordance with the invention, an additional auxiliary elongate element 14 (FIGS. 2 to 7 of the drawings) can be installed so as to extend into each of the six crescent-shaped recesses 13 of each carrier disc 9. However, it is particularly noted that each of the indicated Figures of the drawings shows only one auxiliary elongate element 14 since the formation, installation and removal of each auxiliary element 14 is the same. Each auxiliary elongate element 14 is of the same basic formation as each fixed elongate element 10, that is to say, it is of tubular metal formation having a circular or substantially circular cross-section. In order to fix the auxiliary elongate elements 14 in their operative positions, each of the two carrier discs 9 which is at substantially one of the opposite axial ends of the roller 8 is formed with six holes 15 which holes are on corresponding imaginary radial lines that connect the center of the carrier disc 9 concerned and the centers of the six crescent-shaped recesses 13, each hole 15 being spaced radially inwardly from the center of the recess 13 concerned by a predetermined distance. Each auxiliary elongate element 14 is provided, close to one of its ends, with a support lug 17 (FIGS. 5 and 6) which support lug 17 carrries a pin 16 that can be entered into one of the holes 15 in the corresponding carrier disc 9 that is at one axial end of the roller 8. Close to its opposite axial end, the auxiliary elongate element 14 under discussion carriers a pair of parallel but spaced apart tongues 18 which tongues are formed with aligned holes which, when the element 14 under consideration is installed in its operative position, will register with one of the holes 15 in the carrier disc 9 that is at substantially the opposite axial end of the roller 8 from the disc which receives the corresponding pin 16. That side of the outer one of the two tongues 18 which is nearest to the end of the auxiliary elongate element 14 carriers a housing 19 in which a helical compression spring 20 is so disposed as to urge a retaining pin 21 towards the left as seen in FIG. 6 of the drawings through the aligned holes in the two tongues 18 and, when the element 14 concerned is installed in its operative position, through the appropriates hole 15 that is formed in the "end" carrier disc 9 that is sandwiched between said tongues 18. The retaining pin 21 is of T-shaped configuration, the upright of the T being the pin proper while the crossbar of the T is in the form of a handle 22 which projects through diametrically opposed slots 23 that are formed in opposite sides of the housing 19. The strength of the spring 20 is such that, while it will reliably maintain the pin 21 in its operative position, the handle 22 can readily be operated manually to withdraw said pin 21 into the housing 19 against the action of that spring. Although detracting somewhat from the ease and rapidity of installation and removal of each auxiliary elongate element 14, the housings 19 and pins 21 could, if preferred, be replaced by single retaining bolts.

Each auxiliary elongate element 14 is provided, at appropriate locations along the length thereof, with five substantially sector-shaped stop lugs 24 which stop lugs 24 are welded or otherwise regidly secured to each element 14 in such positions that, as can be seen best in FIG. 6 of the drawings, they will fit snugly in the matchingly shaped recesses 13 in the peripheries of the successive carrier discs 9. It will be remembered that the fixed tubular elongate elements 10 are of helical configuration so that, of course, the auxiliary elongate elements 14 must be of similar configuration. This enables them to be installed as shown best in FIG. 6 of the drawings with some resilient pre-stressing. When installing each element 14, the corresponding pin 16 is first inserted in the appropriate hole 15 and then said element 14 is resiliently deformed to a small extent by the person performing the installation until the spring-loaded retaining pin 21 or alternative single bolt can be placed in its appointed retaining position. Under these circumstances, some or all of the stop lugs 24 will be pressed firmly into engagement with the concave curved surfaces of the matchingly shaped recesses 13.

It is stressed again that only one of the auxiliary elongate elements 14 is shown in the drawings although, in the embodiment that is being described, up to six of them may optionally be included in the roller 8. This will depend upon the nature and condition of the soil that is to be dealt with. Purely for example, the roller 8 will operate most effectively on light sandy soil that is in a dry condition with as many of the auxiliary elongate elements 14 as possible installed so that the implement should be used with all six of the auxiliary elements 14 added to the roller 8 so that said roller 8 has a total of twelve elongate elements comprising the six fixed elements 10 and the six readily releasable elements 14. When heavy soil, for example clay soil, in a wet condition is to be dealt with, there is a danger of the roller 8 becoming clogged internally with mud if it has too many of the elongate elements and it is then best to employ it with all of the auxiliary elements 14 removed. It is, of course, possible to employ, for example, three of the six auxiliary elements 14 in conditions which are intermediate between the two extremes which have just been briefly mentioned.

Substantially vertically disposed shield plates 26 are arranged immediately beyond the opposite ends of the single row of rotary soil working members 3, each shield plate 26 being fastened to a corresponding pair of arms 25 which are pivotable upwardly and downwardly about a substantially horizontal axis that is parallel or substantially parallel to the direction A and that is afforded by a respective pair of pivots mounted on top of the hollow frame portion 1 at locations close to the front and to the rear of that frame portion. Each shield plate 26 has a perpendicularly projecting rim along at least its lower edge which rim can slide over the ground surface when the implement is in use. The pivotal mounting of the shield plates 26 via their arms 25 enables the plates to turn upwardly and downwardly, as may be required, to match undulations in the surface of the soil that is being cultivated by the implement. The shield plates 26 cooperate with the rotary soil working members 3 at the opposite ends of the row of those members in working the soil at the margins of the broad strip of cultivated land that is produced by the implement substantially as thoroughly as is the soil which is nearer to the centre of the broad strip. Additionally, the shield plates 26 substantially prevent any ridging of soil at the margins of the broad strip that is worked by the implement and stop stones and the like from being flung laterally of the path of travel of the implement by the rapidly moving tines of the soil working members 3 thus greatly reducing the danger of injury to bystanders or damage to property that might possibly otherwise be caused by such rapidly ejected stones and the like.

When the implement that has been described is in operation, the maximum depth to which the tines of the rotary soil working members 3 can penetrate into the ground is set, before work commences, by adjusting the level of the axis of rotation of the roller 8 either upwardly or downwardly relative to the frame portion 1 and members 3 by turning the arms 6 upwardly or downwardly, as may be required, about the aligned pivots 5, employing the locking bolts 7 to retain any chosen setting as long as may be required. The implement is supported from the ground surface principally by the roller 8 but, of course, also by the soil working members 3 themselves. There is a tendency for the opposite ends of the roller 8, which extends throughout substantially the whole of the combined working width of the soil working members 3, to dig into the cultivated earth and this causes the narrow strips of soil between the ends of the roller 8 and the shield plates 26 to be pushed upwardly to a small extent, despite the provision of said plates 26, this being undesirable under some working circumstances. The accumulations of soil which would thus be caused at these locations are prevented, or very greatly reduced, by connecting a scraping element or scraper 27 to the rim at the rear of each shield plate 26 by a corresponding pair of bolts 28 (FIGS. 2 and 7). The shapes of the symmetrically identical scraping elements or scrapers 27 can be seen in FIGS. 2, 7 and 8 of the drawings and they are formed from a resilient material which is conveniently spring steel. It will be seen from FIG. 7 of the drawings that the portion of each element 27 which is secured to the corresponding shield plate rim by the bolts 28 is connected by a 180° bend to a substantially vertically downwardly directed portion which terminates, at its lower end, in an inclined blade 29 whose general plane is inclined to the horizontal ground surface at an angle which is preferably not less than substantially 60°. Each blade 29 can thus spread any soil which accumulates as briefly described above rearwardly over its upper surface and also laterally to some extent. It will be seen from the drawings that each scraping element or scraper 27 can readily be formed from a single strip of spring steel or other resilient material.

FIG. 9 of the drawings illustrates an alternative construction in which a scraping element or blade 31 is formed integrally with the lower rim of a shield plate 30 that is manufactured from a single metal plate by a punching operation. Although differently supported, the scraping element or blade 31 has substantially the same shape and disposition as the scraping blade 29 that has been described above.

The front of the hollow frame portion 1 is provided, midway between the planes of its two side plates 4, with a coupling member or trestle 32 that is of substantially triangular configuration as seen in either front or rear elevation. The coupling member or trestle 32 is constructed and arranged for connection to the three-point lifting device or hitch at the rear of an agricultural tractor or other operating vehicle of the implement in a manner which is generally known per se and which is illustrated somewhat diagrammatically in FIG. 1 of the drawings. The shafts 2 are provided, inside the hollow frame portion 1, with corresponding straight-toothed or spurtoothed pinions 33 whose sizes are such that each pinion 33 has its teeth in mesh with those of the or each neighbouring pinion in the single row of twelve such pinions 33. With this arrangement, each pinion 33, shaft 2 and soil working member 3 will rotate, during operation, in the opposite direction to the or each immediately neighbouring similar assembly, the directions of operative rotation of four such assemblies being indicated by arrows in FIG. 1 of the drawings. One of the center pair of shafts 2 in the row of twelve shafts has an upward extension through the top of the hollow frame portion 1 into a gearbox 34 which is secured in place on top of the hollow frame portion 1. A rotary input shaft of the gearbox 34 projects substantially horizontally forwards from the front thereof and can be placed in driven connection with the rear power take-off shaft of the agricultural tractor or other operating vehicle to which the coupling member or trestle 32 is connected by way of an intermediate telescopic transmission shaft, which is of a construction that is known per se, having universal joints at its opposite ends. This arrangement is illustrated somewhat diagrammatically in FIG. 1 of the drawings. The rear of the gearbox 34 carries a change-speed gear which it is not necessary to describe nor to illustrate in detail for the purposes of the present invention and it suffices to say that the change-speed gear can be employed to vary the transmission ratio between the rotary input shaft of the gearbox 34 and the upward extension of the shaft 2 which is in communication with said gearbox so that the speed of rotation of the soil working members 3 can be increased or decreased, as may be required, without having to change the speed of the drive that is applied to the rotary input shaft of the gearbox 34.

When the described soil cultivating implement is to be employed in the cultivation of an area of land, the working level of the members 3 is adjusted, as previously described, by moving the roller 8 upwardly or downwardly, as may be required, relative to the frame portion 1 employing the locking bolts 7 to maintain any chosen depth setting of the soil working members 3 as long as may be needed. The change-speed gear at the rear of the gearbox 34 is also, if required, adjusted to increase or decrease the speed of rotation of the soil working members 3 in response to a substantially standard driving speed of rotation that is applied to the leading end of the rotary input shaft of the gearbox 34. The coupling member or trestle 32 of the implement is connected to the three-point lifting device or hitch of the co-operating agricultural tractor or other operating vehicle whose rear power take-off shaft is employed to drive the soil working members 3 and, as the implement moves operatively in the direction A over land that is to be cultivated, the twelve (in this embodiment) rotary soil working members 3 revolve in the directions indicated by arrows in FIG. 1 of the drawings and work individual but overlapping strips of soil to produce a single broad strip of cultivated land having, in this embodiment, a total width of substantially 3 meters. In addition to performing its depth-control and supporting functions, the open-work cage-formation ground roller 8 acts, in its own right, as a soil working member and will tend to crush any lumps of unbroken soil that are exceptionally left on, or close to, the surface of the ground after treatment by the tines of the immediately foregoing soil working members 3. The roller 8 also performs a soil smoothing and gently compressing action so that, in very many cases, the cultivated soil can be brought to a condition which is suitable for the introduction of seeds or small plants by only a single traverse of the implement. The cultivated soil will generally be in a homogeneously crumbled condition but it will be remembered that the number of auxiliary elongate elements 14 which is employed in the roller 8, if any, will be dependent upon the good judgement of the operator in the light of the nature and condition of the particular soil that is under cultivation.

The scraping blades 29 or 31 which are located at the backs of the shield plates 26 or 30, with respect to the direction A, act to level out any soil ridges which are formed by digging penetration of the opposite ends of the roller 8 into the ground so that, in conjunction with the shield plates 26 or 30 themselves, which already minimise ridging, very little, if any, soil ridging will be produced at the margins of the broad strip of ground that is worked by the implement. Generally speaking, as discussed above, the lighter and drier the soil that is to be dealt with, the greater the number of elongate elements there should be in the skeletal cylindrically curved surface of the roller 8 and, under such conditions, the maximum number of six, or less, of the auxiliary elongate elements 14 can very quickly and easily be installed as described above, their removal being an equally simple and rapid undertaking when the implement is to deal with heavier soil and/or soil that has a higher moisture content. Provided that they are maintained in a substantially undamaged condition, the auxiliary elements 14 can always be quickly and easily installed in the roller 8 since, by employing some degree of resilient stress before engaging the retaining pins 21 or equivalent single bolts, all or most of the corresponding stop lugs 24 will be pre-stressed into resilient engagement with the matchingly shaped peripheral recesses of the carrier discs 9.

Although certain features of the soil cultivating implement that have been described and/or that are illustrated in the accompanying drawings will be set forth in the following claims as inventive features, it is emphasised that the invention is not necessarily limited to those features and that it includes within its scope each of the parts of the soil cultivating implement that have been described, and/or that are illustrated in the accompanying drawings, both individually and in various combinations.

We claim:

1. A soil cultivating implement comprising a frame and soil-working means supported on said frame, including a supporting roller connected to said frame, said roller comprising elongate elements that extend generally transverse to the direction of implement travel and said elements being permanently secured to the peripheries of spaces apart supporting discs, at least one auxiliary element being detachably secured to said discs, said peripheries defining crescent-shaped recesses and matchingly sector shaped stops along the length of the auxiliary element being received in said recesses, quick release means detachably securing said auxiliary element to the outer two discs in operative position, said elements and auxiliary element forming a ground-engaging surface of said roller.

2. An implement as claimed in claim 1, wherein one end of each of said auxiliary elements comprises hook means that co-operates with a hole in one of said two discs and the opposite end of the auxiliary element has locking means that releasably fastens to the second of said two discs.

3. An implement as claimed in claim 2, wherein said locking means comprises a displaceable pin that is supported adjacent said one end and said pin in normal position cooperates with a corresponding hole of said second disc to firmly but releasably secure said auxiliary element to the roller.

4. An implement as claimed in claim 3, wherein said pin is mounted in a housing having a spring and the pin is axially displaceable against the action of said spring.

5. An implement as claimed in claim 1, wherein there are a plurality of auxiliary elements that extend helically around the axis of rotation of said roller, each element being pre-stressed into engagement with said discs.

6. An implement as claimed in claim 5, wherein the auxiliary elements alternate with the fixed elements in the operative condition of said roller.

7. An implement as claimed in claim 6, wherein the two outer discs of the roller are mounted on respective stub shafts, intermediate discs between said outer discs being interconnected only by said elements and auxiliary elements.

8. An implement as claimed in claim 1, wherein each elongate element and auxiliary element is tubular with a substantially circular cross-section.

9. An implement as claimed in claim 1, wherein said soil working means includes soil working members arranged in a row that is substantially horizontally transverse to the direction of travel, each soil working member being rotatable about a corresponding non-horizontal axis said roller being pivoted to the frame by arm means and means setting the working level of said roller relative to said soil working members in any one of a plurality of positions.

10. A soil cultivating implement as claimed in claim 1, wherein there are two outer discs and intermediate discs, said outer discs having recessed peripheries and respective holes adjacent the recesses, one end of said auxiliary element mounting a pin that fits into a hole in a first outer disc, the other end of that element having a pair of tongues, the second outer disc being fitted between said tongues and a locking member releasably interconnecting said tongues to the second disc.

11. An implement as claimed in claim 1, wherein said roller has two outer discs and at least one intermediate disc between the outer discs.

* * * * *